United States Patent
Brahim (10) Patent No.: US 7,653,050 B2
(45) Date of Patent: Jan. 26, 2010

(54) TECHNIQUE FOR IMPLEMENTING A MULTI-SERVICE PACKET AND OPTICAL/TDM VIRTUAL PRIVATE CROSS-CONNECT

(75) Inventor: Hamid Ould Brahim, Kanata (CA)

(73) Assignee: Nortel Networks Limited, St. Laurent, Quebec (CA)

(*) Notice: Subject to any disclaimer, the term of this patent is extended or adjusted under 35 U.S.C. 154(b) by 1173 days.

(21) Appl. No.: 10/326,122

(22) Filed: Dec. 23, 2002

(65) Prior Publication Data

US 2003/0147402 A1 Aug. 7, 2003

Related U.S. Application Data

(60) Provisional application No. 60/354,641, filed on Feb. 5, 2002.

(51) Int. Cl.
H04L 12/66 (2006.01)

(52) U.S. Cl. .............. 370/353; 370/395.5; 370/465

(58) Field of Classification Search ......... 370/352–356, 370/386, 395.5, 401, 465, 466, 469, 467
See application file for complete search history.

(56) References Cited

U.S. PATENT DOCUMENTS

| | | | | |
|---|---|---|---|---|
| 6,108,702 | A * | 8/2000 | Wood | 709/224 |
| 6,614,809 | B1 * | 9/2003 | Verma et al. | 370/469 |
| 6,760,339 | B1 * | 7/2004 | Noel et al. | 370/401 |
| 6,789,118 | B1 * | 9/2004 | Rao | 709/225 |
| 6,907,047 | B2 * | 6/2005 | Chen et al. | 370/467 |
| 6,937,574 | B1 * | 8/2005 | Delaney et al. | 370/254 |
| 6,973,504 | B2 * | 12/2005 | Nomura | 709/235 |
| 7,152,115 | B2 * | 12/2006 | Brahim et al. | 709/238 |
| 2002/0037010 | A1 * | 3/2002 | Yamauchi | 370/395.53 |
| 2002/0071427 | A1 * | 6/2002 | Schneider et al. | 370/352 |
| 2003/0026271 | A1 * | 2/2003 | Erb et al. | 370/401 |
| 2003/0123446 | A1 * | 7/2003 | Muirhead et al. | |

FOREIGN PATENT DOCUMENTS

| | | |
|---|---|---|
| EP | 1052810 | 11/2000 |
| EP | 1052810 A2 * | 11/2000 |
| EP | 133630 | 6/2003 |
| WO | WO 02/075548 | 9/2002 |
| WO | WO 02/075548 A1 * | 9/2002 |

OTHER PUBLICATIONS

Jaeger, R., "Performance Management Issues of Currently Operated ATM Enterprise Networks," IEEE Communications Magazine, Jan. 1996, vol. 34, iss. 1, pp. 70-76.*

Hamid Ould-Brahim, et al., GVPN: Generalized Provider-Provisioned Port-Based VPNs Using BGP and GMPLS, http://www.ietf.org/internet-draft-ouldbrahim-ppvpn-gvpn-bjpgmpls-02, pp. 1-19, Dec. 2002, "Work In Progress".

(Continued)

Primary Examiner—Donald L Mills
(74) Attorney, Agent, or Firm—Hunton & Williams, LLP (57) ABSTRACT

A technique for implementing an automatic port discovery protocol in a virtual private network cross-connect is disclosed. In one particular exemplary embodiment, the technique may be realized by a method comprising the steps of implementing a virtual private cross-connect for supporting a plurality sites associated with at least one virtual private network; providing at least one connection between the virtual private cross-connect and each site; and supporting a combination of at least two of layer-3, layer-2 and layer-1 services.

17 Claims, 6 Drawing Sheets

OTHER PUBLICATIONS

Hamid Ould-Brahim, et al., VPOXC Provider Provisioned Virtual Private Optical Cross-Connect Service, http://www.ieft.org/internet-draft-ouldbrahim-ppvpn-vpoxc-01.txt, pp. 1-9, Jun. 2002, "Work In Progress".

Hamid Ould-Brahim, et al., Service Requirements for Optical Virtual Private Networks, draft-ouldbrahim-ovpn-requirements-01.txt pp. 1-19, Nov. 2001.

European Search Report, EP Application No. 03250746.9-1237, dated Apr. 28, 2005.

Jager, R., "Performance Management Issues of Currently Operated ATM Enterprise Networks", IEEE Communications Magazine, vol. 34, issue 1, pp. 70-76, Jan. 1996.

European Search Report for Application No. 03 250 746.9-1237, dated Oct. 6, 2006.

* cited by examiner

TECHNIQUE FOR IMPLEMENTING A MULTI-SERVICE PACKET AND OPTICAL/TDM VIRTUAL PRIVATE CROSS-CONNECT

CROSS-REFERENCE TO RELATED APPLICATIONS

This patent application claims priority to U.S. Provisional Patent Application No. 60/354,641, filed Feb. 5, 2002, which is hereby incorporated by reference herein in its entirety.

FIELD OF THE INVENTION

The present invention relates generally to virtual private networks and, more particularly, to a technique for implementing a multi-service packet and optical/TDM (Time division multiplexing) virtual private cross-connect.

BACKGROUND OF THE INVENTION

Due to recent developments in fiber-optics-based networks and carrier virtual private network technologies, optical virtual private network (OVPN) services are currently being explored in the industry. Most call-based network architectures currently deployed are designed towards providing a basic unit of service that usually entails providing connectivity between two network public entry endpoints. The set of services and associated network architecture are based on a call based model and require architectural building blocks that are call centric.

The call based model is characterized by an emphasis on bandwidth and connectivity, achieved generally through complex in-house built dedicated network solutions. As a result, the architecture is very expensive. Under the call based model, connectivity services are generally transport dependent type services. Oftentimes, these services require major and expensive upgrades to the transport technology used.

Currently, virtual private network (VPN) architectures built around the call based model focus on restricting connectivity to a group of users (e.g., closed-user group). Mechanisms used in these architectures are call centric, which involves a user subscribing to a closed-user group and a network defining a set of rules for incoming and outgoing calls to/from the group to an open portion of the network.

Call-based architectures have traditionally minimized or ignored the importance of providing carrier based VPN services that offer complete client flexibility, reduce operational complexity and introduce new added-value services beyond basic point-to-point connectivity.

In view of the foregoing, it would be desirable to provide a technique for implementing a multi-service packet and optical/TDM virtual private cross-connect. More particularly, to implement mechanisms associated with VPN auto-discovery and Generalized Multi Protocol Label Switching (GMPLS) to provide virtual private optical cross-connect and/or GMPLS-based packet-based port-based VPNs in an efficient and cost effective manner.

SUMMARY OF THE INVENTION

According to the present invention, a technique for implementing a multi-service packet and optical/TDM virtual private cross-connect is provided. In one particular exemplary embodiment, the technique may be realized by a method for implementing a multi-service packet and optical/time division multiplexing virtual private cross-connect comprising the steps of implementing a virtual private cross-connect for supporting a plurality sites associated with at least one virtual private network; providing at least one connection between the virtual private cross-connect and each site; and supporting a combination of at least two of layer-3, layer-2 and layer-1 services.

In accordance with other aspects of this particular exemplary embodiment of the present invention, the virtual private cross-connect supports at least one packet-based link wherein the packet-based link comprises one of IP, ATM, Frame Relay and Ethernet; the layer-3 service comprises an Internet Protocol based network and wherein at least one connection associated with the layer-3 service is an Internet Protocol link; the at least one connection is provided at the virtual private cross-connect by at least one port associated with each connection wherein the at least one port supports at least one private address; the layer-2 service comprises Asynchronous Time Multiplexing and wherein at least one connection associated with the layer-2 service is a GMPLS link; the virtual private cross-connection provides flexible port topology determination; the virtual private cross-connection provides flexible on-demand connectivity and the virtual private cross-connection provides private port auto-discovery.

According to another particular exemplary embodiment, a computer signal embodied in a carrier wave readable by a computing system and encoding a computer program of instructions for executing a computer process performing the method recited above.

According to another particular exemplary embodiment, a system for implementing a multi-service packet and optical/time division multiplexing virtual private cross-connect comprises a virtual private cross-connect for supporting a plurality sites associated with at least one virtual private network; and at least one connection between the virtual private cross-connect and each site; wherein the virtual private cross-connect supports a combination of at least two of layer-3, layer-2 and layer-1 services.

In accordance with other aspects of this particular exemplary embodiment of the present invention, the layer-3 service comprises an Internet Protocol based network and wherein at least one connection associated with the layer-3 service is an Internet Protocol link; the at least one connection is provided at the virtual private cross-connect by at least one port associated with each connection wherein the at least one port supports at least one private address; the layer-2 service comprises Asynchronous Time Multiplexing and wherein at least one connection associated with the layer-2 service is a GMPLS link; the virtual private cross-connection provides flexible port topology determination; the virtual private cross-connection provides flexible on-demand connectivity; the virtual private cross-connection provides private port auto-discovery; and the virtual private cross-connect supports at least one packet-based link wherein the packet-based link comprises one of IP, ATM, Frame Relay and Ethernet.

According to another particular exemplary embodiment, an article of manufacture for implementing a multi-service packet and optical/time division multiplexing virtual private cross-connect comprises at least one processor readable carrier; and instructions carried on the at least one carrier; wherein the instructions are configured to be readable from the at least one carrier by at least one processor and thereby cause the at least one processor to operate so as to implement a virtual private cross-connect for supporting a plurality sites associated with at least one virtual private network; provide at least one connection between the virtual private cross-connect and each site; and support a combination of at least two of layer-3, layer-2 and layer-1 services.

In accordance with other aspects of this particular exemplary embodiment of the present invention, the layer-3 service comprises an Internet Protocol based network and wherein at least one connection associated with the layer-3 service is an Internet Protocol link and the layer-2 service comprises Asynchronous Time Multiplexing and wherein at least one connection associated with the layer-2 service is a GMPLS link.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

According to an embodiment of the present invention, a multi-service packet and optical/TDM virtual private cross-connect may support a combination of services, including layer-3 (such as Internet Protocol-based networks), layer-2 (such as frame relay (FR), ATM (Asynchronous Time Multiplexing) or Ethernet VPNs), layer-1 (such as Synchronous Optical Network Technologies (SONET)/Synchronous Digital Hierarchy (SDH) network) and an optical/time division multiplexing (TDM) network. A customer of a provider network may subscribe to a multi-service virtual private cross-connect (VPXC). A VPXC may appear to a customer network as a virtual node within the network and may be addressed using a client addressing scheme. A VPXC may use techniques associated with a virtual private optical cross-connect with the exception that the VPXC may also accommodate packet-based links, such as IP, ATM, Ethernet or other packet-based links. In a Provider Provisioned Virtual Private Service Network, a VPXC may provide packet-based layer-2, layer-3 and GMPLS-based Optical/TDM VPN services where the concept of GMPLS-based Virtual Private optical/TDM cross-connect may be extended to include packet-based VPNs. The VPXC may also use technology developed in provider pro-visioned virtual private networks (e.g., L3, L2, OVPNs) such as VPN auto-discovery used for Virtual Private Optical Cross-Connect (VPOXC) and Generalized VPN (GVPN) as applied to layer-2 circuits, for example. Generalized VPN is a technology that allows providers to offer optical/TDM VPN services to their customers. GVPN is a port-based VPN. A customer may signal any connectivity between at least two customer sites. According to an embodiment of the present invention, a Virtual Private Optical Cross-connect may be considered a variation of GVPN technology, allowing the provider to offer VPN services where the provider network appears as a virtual private node to the client network. This virtual node may support optical/TDM links, for example. The customer may compute in a routing system paths that cross the virtual node (e.g., VPOXC).

Figure 1:
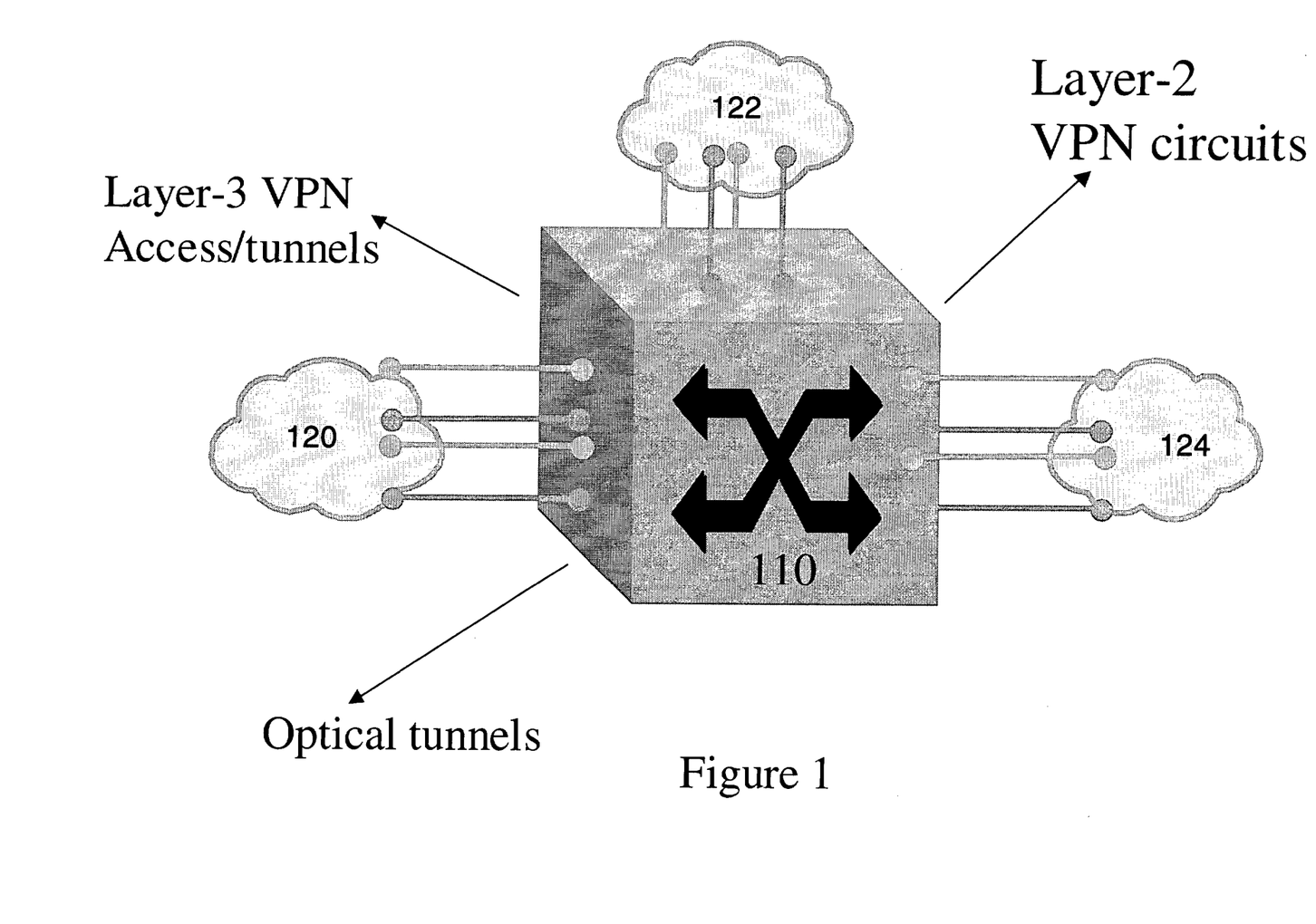
FIG. 1 is a diagram illustrating a multi-service virtual private cross-connect (VPXC) in accordance with an embodiment of the present invention.

FIG. 1 is a diagram of a multi-service virtual private cross-connect in accordance with an embodiment of the present invention. As shown in FIG. 1, VPXC 110 may support multiple types of services. VPXC 110 may be connected to a plurality of sites associated with a VPN. For example, Site 120 of a VPN is connected to VPXC 110 via links 130. Site 122 of the VPN is connected to VPXC 110 via links 132. Site 124 of the VPN is connected to VPXC 110 via links 132. Multi-service virtual private cross-connect 110 may support layer-3 VPN access/tunnels, layer-2 VPN circuits, layer-1 optical tunnels and intelligent L3/L2/L1 cross-connect.

A service provider network offering VPXC services may include devices such as optical network element (ONE) which may include optical cross connects (OXCs), Routers, ATM, Frame Relay or Ethernet switches, SONET/SDH Cross Connects and other similar devices. These devices may be partitioned into P (Provider) and PE (Provider Edge), for example. The P may be connected to other PE or P within a provider's network. The PE may be connected to P within the provider network as well as to devices outside of the provider network. Such other devices may be referred to as client edge devices (CEs). An example of a CE may include a router, a SONET/SDH Cross Connect, an Ethernet switch or other similar device. To each CE port of the same VPN, the service provider may appear as a multi-service virtual private cross-connect where customer ports are attached to it. For the purpose of the VPXC service, resources used to connect a CE to a VPXC may be represented as a traffic engineering (TE) link. As a result, constructs (e.g., link bundling, etc.) applicable to TE links are applicable here as well. For a given TE link that connects a CE to a (VPXC) PE, an end point of the TE link connected to the CE may be referred to as CE port, while an end point of the TE link connected to the (VPXC) PE may be referred to as VPXC port.

Figure 2:
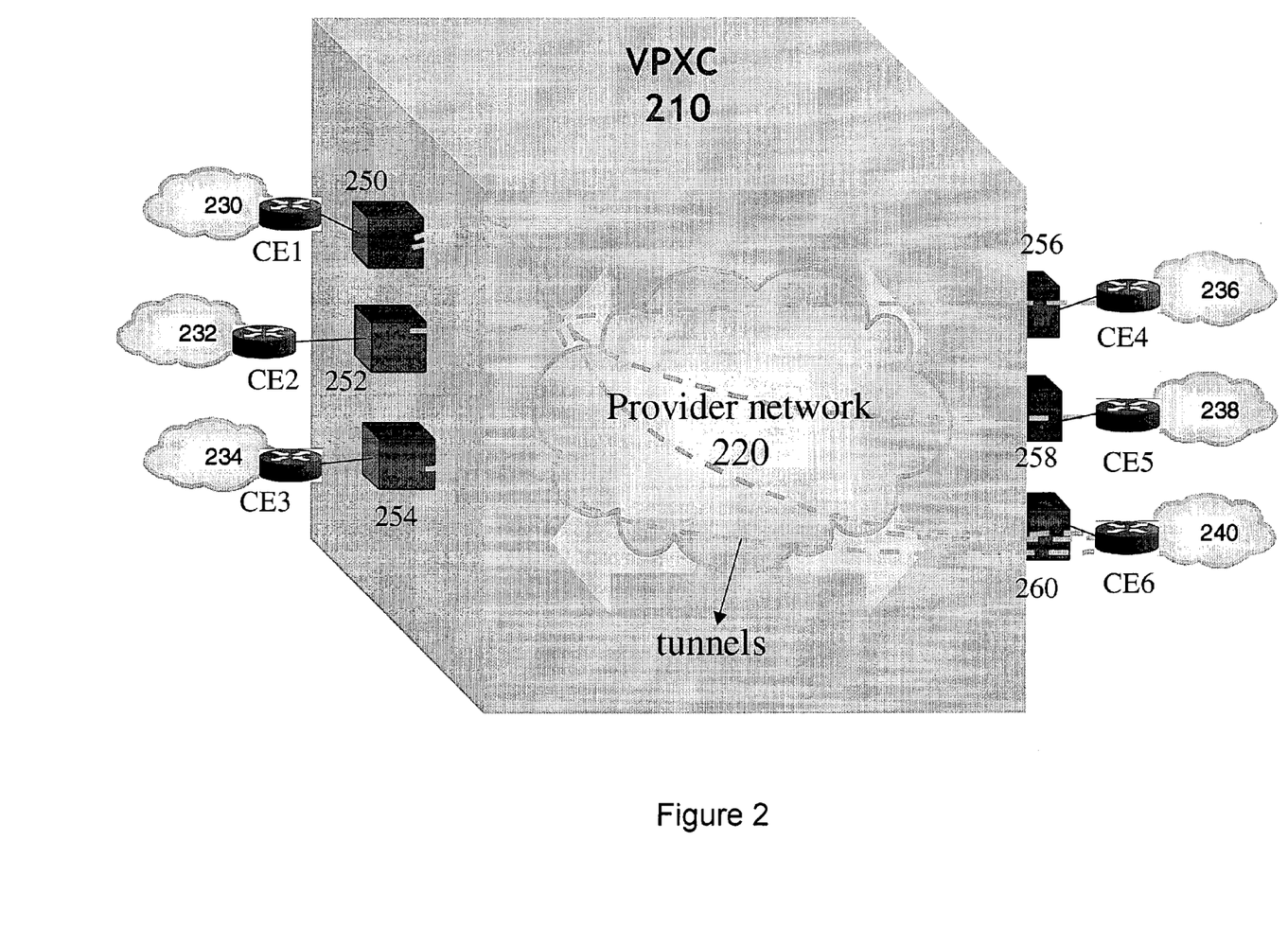
FIG. 2 is a diagram illustrating a VPXC that connects a plurality of sites associated with the same VPN in accordance with an embodiment of the present invention.

FIG. 2 is a diagram illustrating a VPXC that connects a plurality of sites associated with a VPN in accordance with an embodiment of the present invention. VPXC 210 may support provider network 220 for establishing connectivity and tunnels between/among multiple sites 230, 232, 234, 236, 238 and 240. The example of FIG. 2 may support layer-1 services. Client Edge (CE) devices CE1, CE2, CE3, CE4, CE5 and CE6 may support sites 230, 232, 234, 236, 238 and 240, respectively. Ports 250, 252, 254, 256, 258 and 260 associated with CE1, CE2, CE3, CE4, CE5 and CE6, respectively may represent packet/optical/TDM port(s). In addition, the ports may support private addresses as used in a Virtual Private Network.

According to an embodiment of the present invention, VPXC mode(s) of operations may be considered independent from a provider internal network mode(s) of operations. VPXC bandwidth may be increased/decreased without impacting provider/private networks. The provider may also add/remove nodes/links within a switched private partition without impacting client addressing. Thus, a VPOXC based VPSTN provides flexibility to the client and optimal scalability for the provider.

A VPXC may tunnel multiple layer-1, layer-2, or layer-3 customer VPN services using layer-1, layer-2 and/or layer-3 defined tunnels such as IPSec, ATM, FR, SONET/SDH, etc. Tunneling for layer-1 may involve using the hierarchical concept by nesting multiple connections by their order of physical definition. For example, TDM may be nested on top of a lambda type connection.

Figure 3:
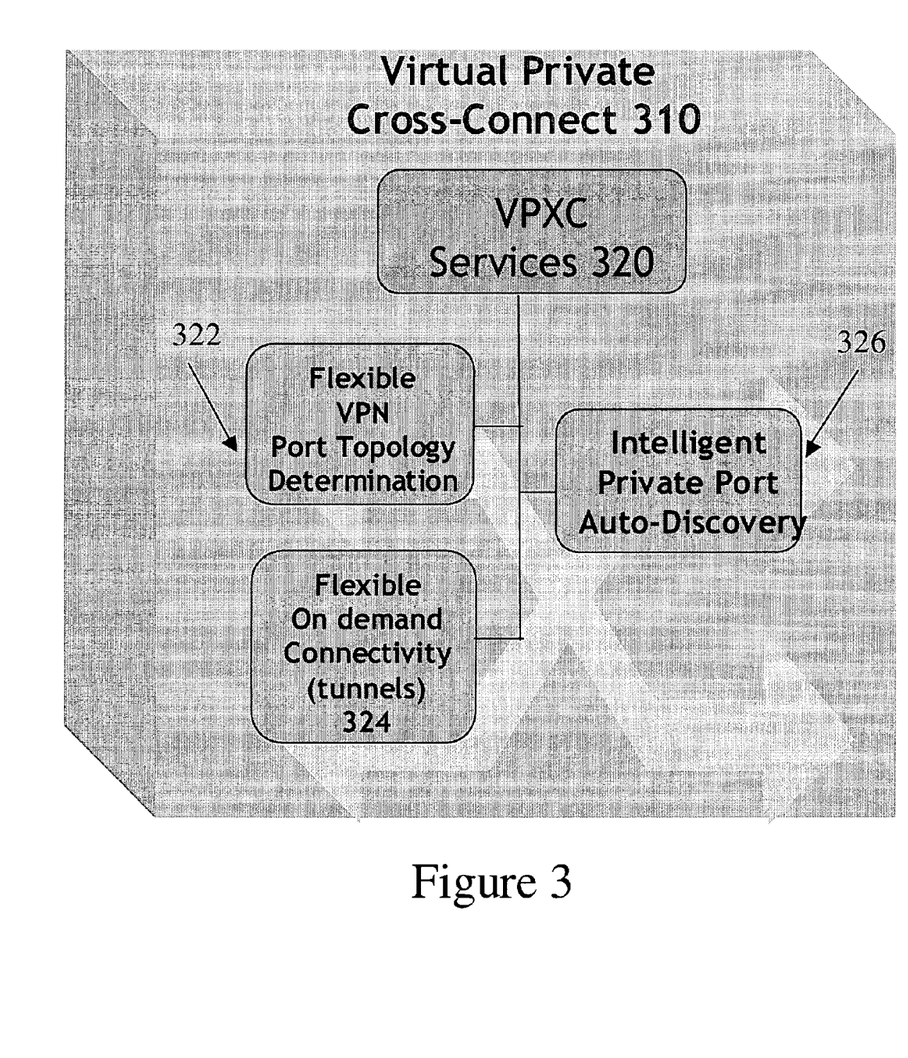
FIG. 3 is a diagram of VPXC functions in accordance with an embodiment of the present invention.

FIG. 3 is a diagram of VPXC functions in accordance with an embodiment of the present invention. VPXC 310 may provide various services 320, such as flexible VPN port topology determination 322, flexible on-demand connectivity (e.g., tunnels) 324 and intelligent private port auto-discovery 326. Other services or functions may be provided as well. The VPXC may implement a wide spectrum of port topologies, including a full mesh port topology (e.g., hub and spoke, arbitrary, etc.) and other topologies. The auto discovery functionality may be similar to that used in VPOXC and Generalized VPNs (GVPN), for example. In particular, the provider may run a discovery mechanism that distributes the VPXC port information in a similar manner as performed with GVPN and VPOXC.

Other advantages of various embodiments of the present invention may include enabling clients to monitor VPXC operations using defined tools; support of a range of security capabilities for private control traffic; support of a range of quality of service (QoS) capabilities; use of VPXC technology at a node level and at a network level where a VPXC may be built from multiple physical resources partitioned among a set of physical cross-connects; network independence between VPXCs and provider networks; support for online/offline traffic engineering per VPXC running on a customer network; and support for inter-service provider VPXCs.

A VPXC may implement functions related to a VPN auto-discovery for layer-1, layer-2 and/or layer-3. In addition, a VPXC may implement GMPLS based signalling for both packet and optical links. Further, a VPXC may be associated with a VPN membership scheme which may include VPN-IDs (such as defined in RFC2685 or route-target such as used in Border Gateway Protocol (BGP) based protocols).

A VPXC customer may define a VPXC topology to be supported by a service provider. Within a VPSTN topology, the customer may select and control any connectivity topology. The provider may restrict and constrain port-to-port connectivity according to the topology implemented within the VPxC. VPXC topology determination may be derived from explicit configuration of the import/export policy for the route-target values of from explicit signalling of the topology information.

In addition, multiple services may be provided on a single VPXC where a VPXC customer may provide VPXC services and/or other VPN services. Addition of a new VPXC will not impact other VPXCs. Provider internal network operations may be isolated from VPXC customer network operations. As VPXC are multi-service by nature, VPXCs may be used in multiple types of networks that include optical metro, access and long haul networks and/or layer-2 and layer-3 networks. Flexible mobility between VPXCs and provider network equipment may also be achieved through various embodiments of the present invention.

Customers may use (G)MPLS based signaling to signal any packet or optical connectivity according to a topology implemented by the VPXC. Client devices may operate within a VPXC space independently from the service provider network operations. VPXC may be instantiated on one or more physical devices. A customer may own one or more VPXCs and build routing peering between the VPOXCs within a private network.

Figure 4:
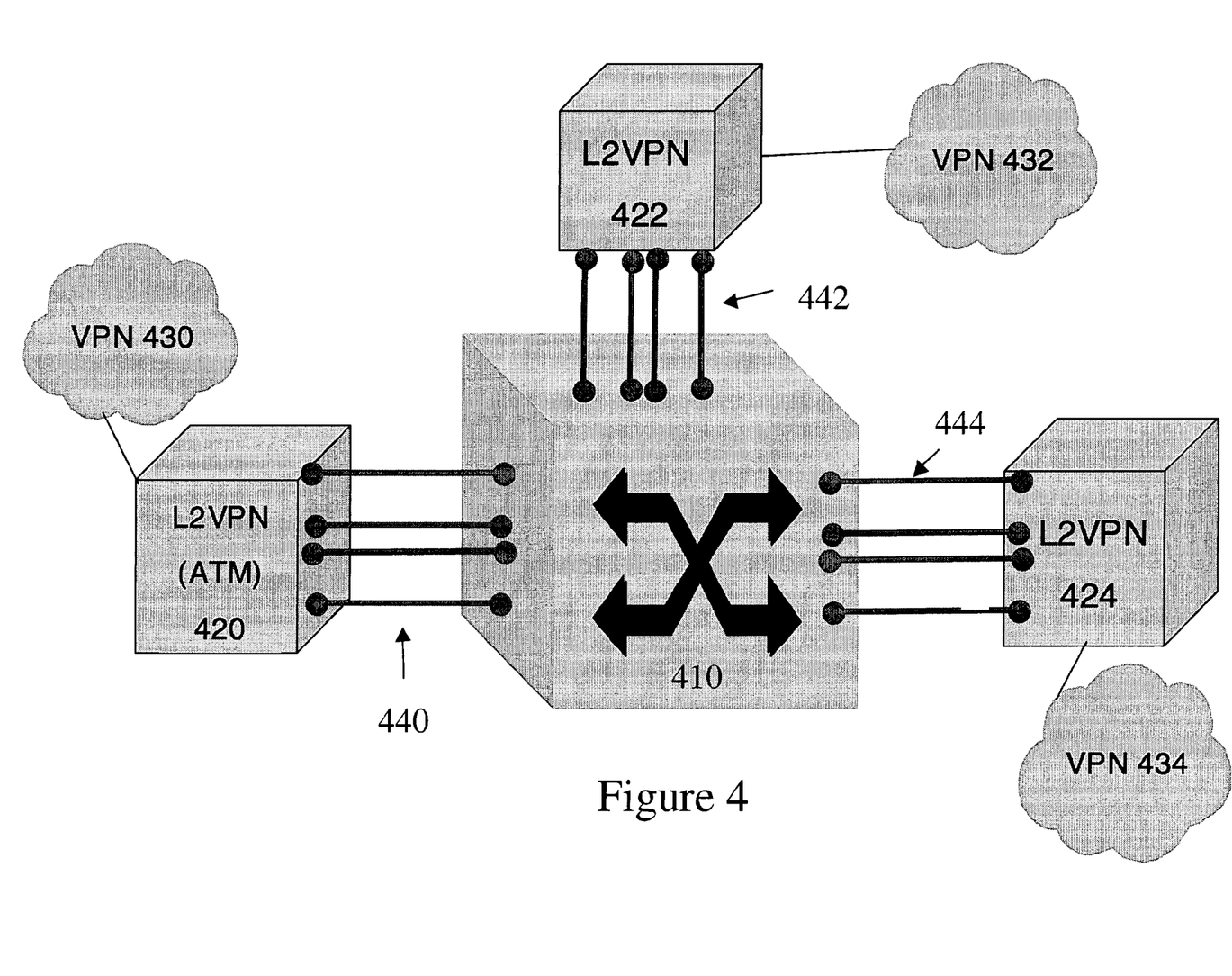
FIG. 4 is a diagram illustrating a layer-2 VPN service in accordance with an embodiment of the present invention.

FIG. 4 is a diagram illustrating a layer-2 VPN service with VPXC in accordance with an embodiment of the present invention. VPXC 410 may be connected to a plurality of layer-2 VPNs, which may support ATM. For example, VPN 420 is a layer-2 VPN support ATM, such is connected to VPN A 430. Links 440 between VPXC 410 and VPN 420 may be GMPLS links. VPN 422 is a layer-2 VPN connected to VPN A 432. Links 442 between VPXC 410 and VPN 422 may be GMPLS links. VPN 424 is a layer-2 VPN connected to VPN A 434. Links 444 between VPXC 410 and VPN 424 may be GMPLS links. VPN 430, 432 and 434 may represent a site associated with a single VPN. VPXC 410 further supports layer-2 VPN tunnels for establishing connectivity between/among the layer-2 VPNs.

GMPLS signaling may be used to create CE-VPOXC-CE connections or inter-CE connections through the VPXC(s). For example, RSVP-TE or CR-LDP protocols may be implemented. A layer-2 VPXC may be considered a VPXC where the links are layer-2 links. The VPXC may be addressed through Ethernet layer-2 and/or layer-3 addresses. A customer may peer at layer-2 with the VPXC. In addition, a customer device may use GMPLS-based signalling to request a layer-2 service.

Figure 5:
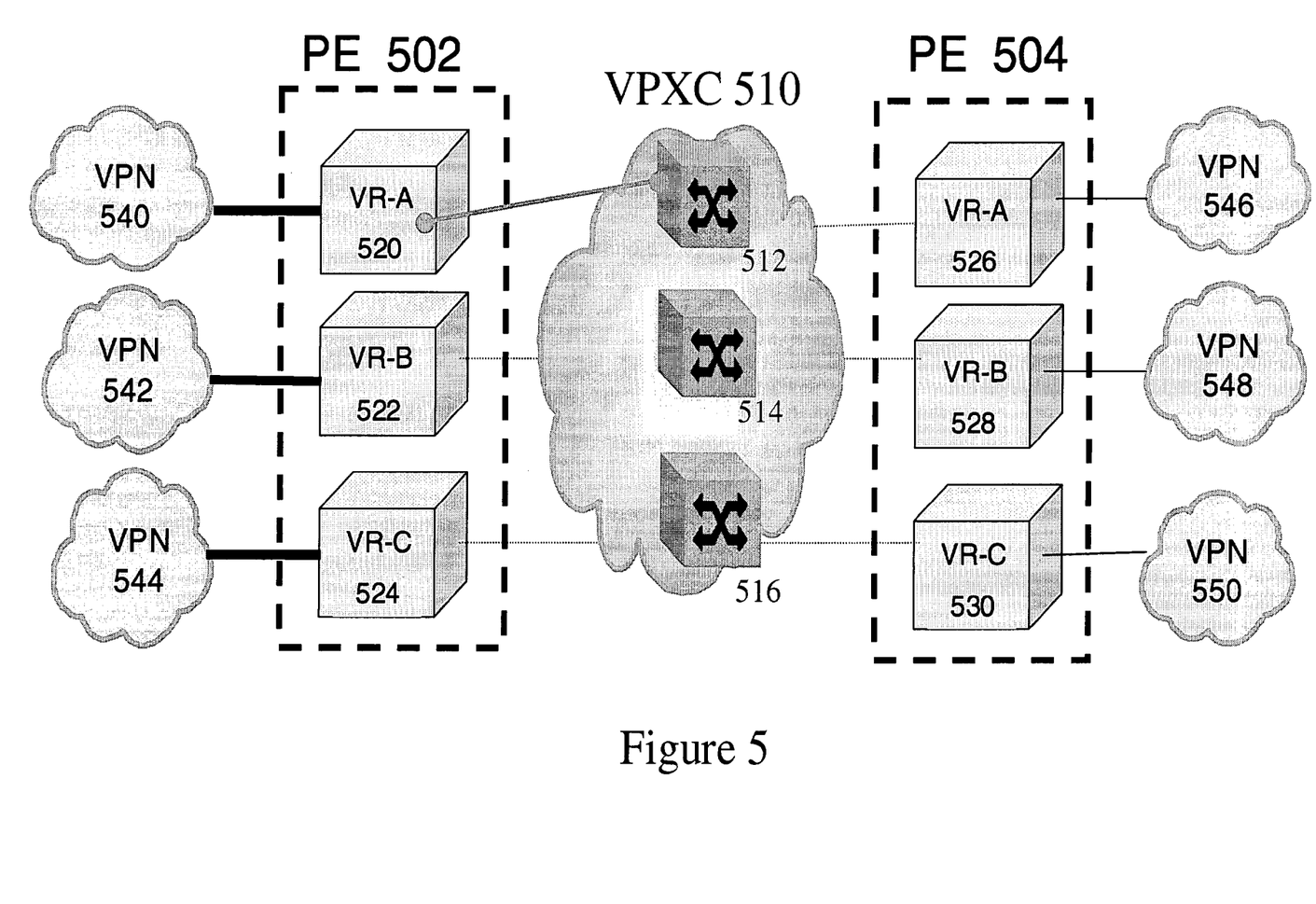
FIG. 5 is a diagram illustrating a layer-3 VPN service in accordance with an embodiment of the present invention.

FIG. 5 is a diagram illustrating a layer-3 VPN service in accordance with an embodiment of the present invention. VPXC structure 510 may include a plurality of VPXCs, as shown by VPXC 512, VPXC 514 and VPXC 516. VPXC 510 may be connected to one or more PE nodes, such as PE 502, which may include a plurality of Virtual Routers, such as VR 520, VR 522 and VR 524, and PE 504 which may include a plurality of Virtual Routers, such as VR 526, VR 528 and VR 530. Each Virtual Router may be connected to a VPN via an IP link. For example, VR 520 may be connected to VPN 540 via an IP link; VR 522 may be connected to VPN 542 via an IP link and VR 524 may be connected to VPN 544 via an IP link. In addition, VR 526 may be connected to VPN 546 via an IP link; VR 528 may be connected to VPN 548 via an IP link and VR 530 may be connected to VPN 550 via an IP link. Each VPN may represent a site associated with a single VPN. The connectivity may be created and/or established automatically. In addition, tunnels within VPXC 510 do not need to be configured end-to-end.

A VPXC may peer with a client device at layer-3. The VPXC may appear as one hop away from the CE. A layer-3 VPXC may be used for both building layer-3 tunnels and connecting the VPXC to an existing IP VPN service, such as virtual router or RFC2547bis. In addition, a CE may directly peer with the VPXC at layer-3.

A layer-1 service with VPXC is similar to the concept of virtual private Optical/TDM cross-connect. For example, layer-1 service may be supported in a VPXC as illustrated in FIG. 2. The customer may use GMPLS to request Optical/TDM connectivity between two CEs attached to the VPXC.

A VPXC may have links that are a combination of layer-1, layer-2 and layer-3. In that respect, the VPXC may connect ports that are of the same layer type, ports that may interwork and/or ports that are compatible. For example, an ATM link may be connected to another ATM or frame relay link but not to SONET/SDH link of the VPXC.

Figure 6:
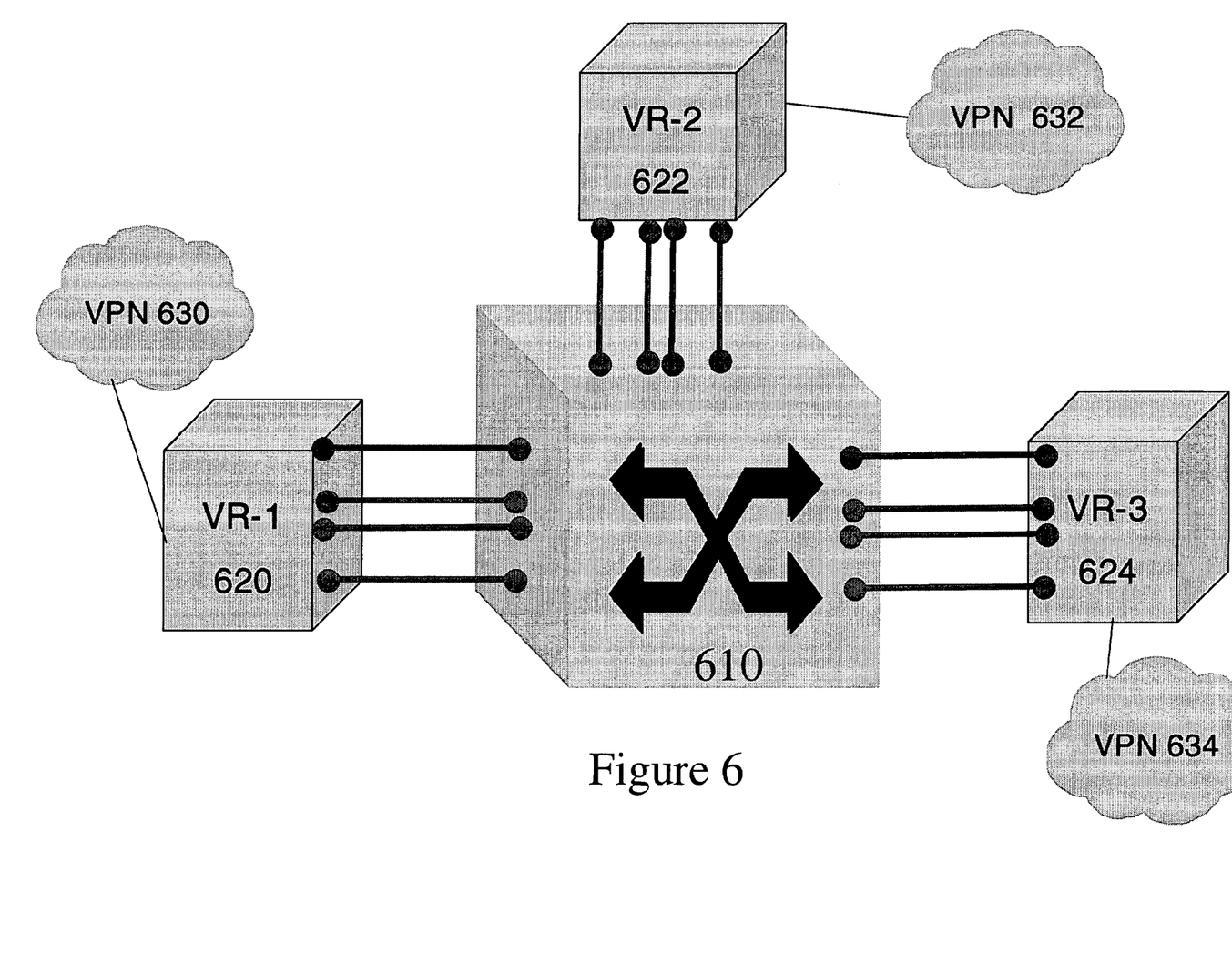
FIG. 6 is a diagram illustrating a layer-2 VPXC service used with an IP VPN service in accordance with an embodiment of the present invention.

FIG. 6 is a diagram illustrating a layer-2 VPXC service used with an IP VPN service in accordance with an embodiment of the present invention. VPXC 610 may be connected to a plurality of Virtual Routers, such as VR 620, VR 622 and VR 624. Each Virtual Router may also be connected to a VPN. For example, VR 620 is connected to VPN 630, VR 622 is connected to VPN 632, and VR 624 is connected to VPN 634. In this example, layer-3 may use layer-2/Optical Cross connect auto-discovery performed on the VPXC 610. In another example, if the VPXC is of layer-2 links, the VPOXC may provide layer-2 tunnel connectivity between virtual routers. In another example, if the VPXC has links of SONET/SDH, the VPXC may provide layer-1 connectivity between virtual routers. In both examples, the VPXC may be run layer-1 or layer-2 auto discovery.

Since a VPXC may accommodate multiple layers, the VPXC may nest multiple types of VPXC. For example, a layer-2 VPXC may be built on top of layer-1 VPXC. Layer-2 circuits may be then tunneled through connections provided by layer-1 VPXC.

At this point it should be noted that implementing a multi-service packet and optical/TDM virtual private cross-connect in accordance with the present invention as described above typically involves the processing of input data and the generation of output data to some extent. This input data processing and output data generation may be implemented in hardware or software. For example, specific electronic components may be employed in a node or similar or related circuitry for implementing a multi-service packet and optical/TDM virtual private cross-connect in accordance with the present invention as described above. Alternatively, one or more processors operating in accordance with stored instructions may implement the functions associated with implementing a multi-service packet and optical/TDM virtual private cross-connect in accordance with the present invention as described above. If such is the case, it is within the scope of the present invention that such instructions may be stored on one or more processor readable media, or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for implementing a multi-service packet and optical/time division multiplexing virtual private cross-connect, the method comprising the steps of:
    providing a virtual private cross-connect for supporting a plurality sites associated with at least one virtual private network;
    providing at least one connection between the virtual private cross-connect and each site, wherein the at least one connection supports at least one of layer-3, layer-2 and layer-1 services; and
    supporting a combination of at least two of the layer-3, the layer-2 and the layer-1 services via a virtual private cross-connect tunnel, wherein the virtual private cross-connect tunnel supports a plurality of layer-3, layer-2 and layer-1 defined tunnels within the virtual private cross-connect.

2. The method of claim 1, wherein the virtual private cross-connect supports at least one packet-based link wherein the packet-based link comprises one of IP, ATM, Frame Relay and Ethernet.

3. The method of claim 1, wherein the layer-3 service comprises an Internet Protocol based network and wherein at least one connection associated with the layer-3 service is an Internet Protocol link.

4. The method of claim 1, wherein the at least one connection is provided at the virtual private cross-connect by at least one port associated with each connection wherein the at least one port supports at least one private address.

5. The method of claim 1, wherein the virtual private cross-connection provides flexible port topology determination.

6. The method of claim 1, wherein the virtual private cross-connection provides flexible on-demand connectivity.

7. The method of claim 1, wherein the virtual private cross-connection provides private port auto-discovery.

8. At least one processor readable storage medium for storing a computer program of instructions configured to be readable by at least one processor for instructing the at least one processor to execute a computer process for performing the method recited in claim 1.

9. A system for implementing a multi-service packet and optical/time division multiplexing virtual private cross-connect, the system comprising:
    a virtual private cross-connect for supporting a plurality sites associated with at least one virtual private network;
    at least one connection between the virtual private cross-connect and each site, wherein the at least one connection supports at least one of layer-3, layer-2 and layer-1 services; and
    wherein the virtual private cross-connect supports a combination of at least two of the layer-3, the layer-2 and the layer-1 services via a virtual private cross-connect tunnel, wherein the virtual private cross-connect tunnel supports a plurality of layer-3, layer-2 and layer-1 defined tunnels within the virtual private cross-connect.

10. The system of claim 9, wherein the layer-3 service comprises an Internet Protocol based network and wherein at least one connection associated with the layer-3 service is an Internet Protocol link.

11. The system of claim 9, wherein the at least one connection is provided at the virtual private cross-connect by at least one port associated with each connection wherein the at least one port supports at least one private address.

12. The system of claim 9, wherein the virtual private cross-connection provides flexible port topology determination.

13. The system of claim 9, wherein the virtual private cross-connection provides flexible on-demand connectivity.

14. The system of claim 9, wherein the virtual private cross-connection provides private port auto-discovery.

15. The system of claim 9, wherein the virtual private cross-connect supports at least one packet-based link wherein the packet-based link comprises one of IP, ATM, Frame Relay and Ethernet.

16. An article of manufacture for implementing a multi-service packet and optical/time division multiplexing virtual private cross-connect, the article of manufacture comprising:
    at least one processor readable storage medium; and
    instructions carried on the at least one storage medium;
    wherein the instructions are configured to be readable from the at least one storage medium by at least one processor and thereby cause the at least one processor to operate so as to:

provide a virtual private cross-connect for supporting a plurality sites associated with at least one virtual private network;

provide at least one connection between the virtual private cross-connect and each site, wherein the at least one connection supports at least one of layer-3, layer-2 and layer-1 services; and support a combination of at least two of the layer-3, the layer-2 and the layer-1 services via a virtual private cross-connect tunnel, wherein the virtual private cross-connect tunnel supports a plurality of layer-3, layer-2 and layer-1 defined tunnels within the virtual private cross-connect.

17. The article of manufacturing of claim 16, wherein the layer-3 service comprises an Internet Protocol based network and wherein at least one connection associated with the layer-3 service is an Internet Protocol link.

* * * * *

UNITED STATES PATENT AND TRADEMARK OFFICE
CERTIFICATE OF CORRECTION

PATENT NO. : 7,653,050 B2 Page 1 of 1
APPLICATION NO. : 10/326122
DATED : January 26, 2010
INVENTOR(S) : Hamid Ould Brahim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1418 days.

Signed and Sealed this

Twenty-eighth Day of December, 2010

David J. Kappos
*Director of the United States Patent and Trademark Office*